Patented Jan. 30, 1940

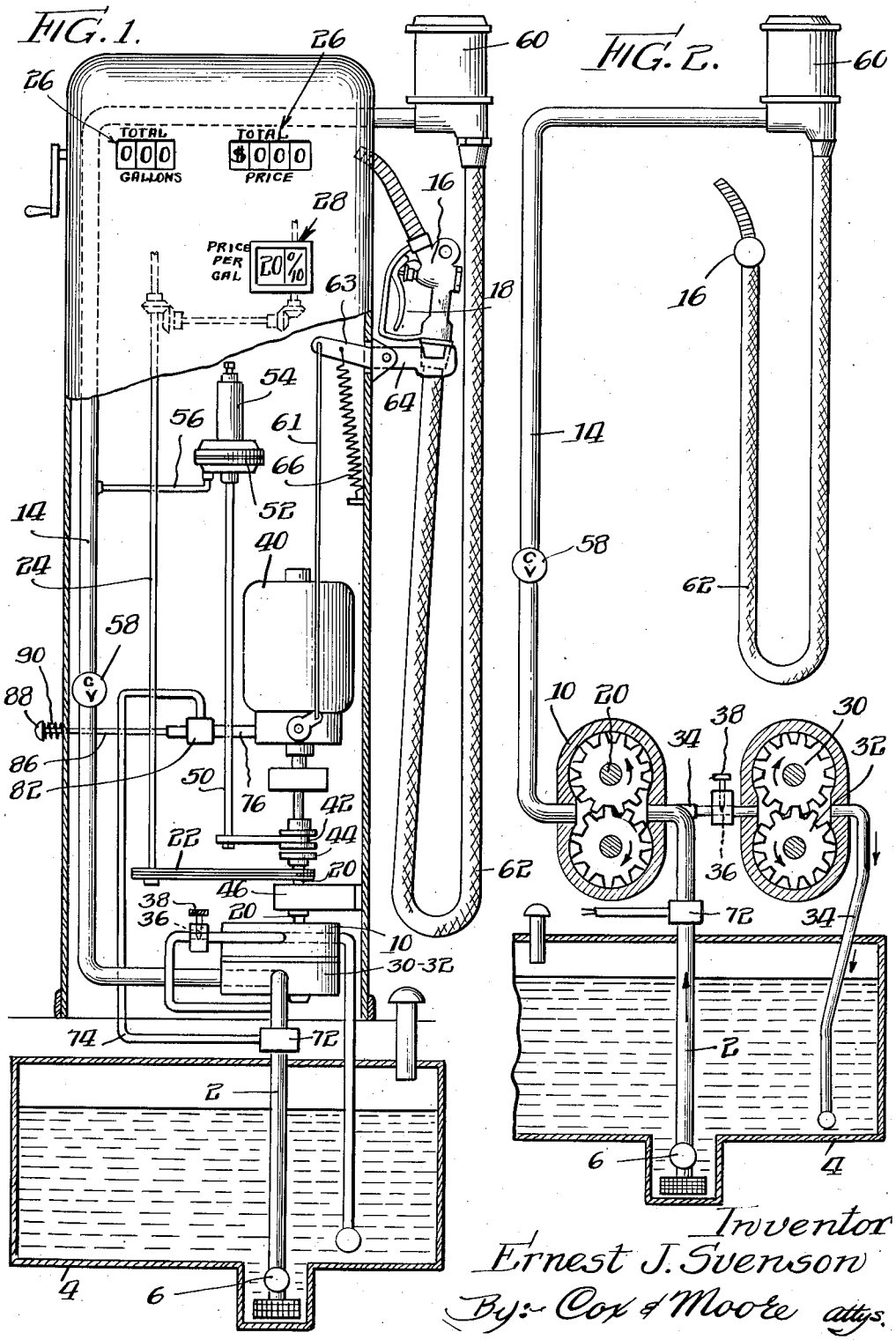

2,188,849

UNITED STATES PATENT OFFICE 2,188,849

COMPUTING DISPENSING DEVICE

Ernest J. Svenson, Rockford, Ill., assignor to Petrolator Corporation, Chicago, Ill., a corporation of Illinois Application July 23, 1937, Serial No. 155,265

7 Claims. (Cl. 221—95)

This invention relates to liquid dispensing devices and more particularly to a gasoline dispensing device of the computer type.

Among the objects of my invention are to provide a gasoline dispensing device of the so-called computer type wherein a meter pump is disposed directly in the flow line for not only forcing the liquid through the flow line but also for continuously measuring the liquid as it is forced, and wherein volume and cost register means are operated synchronously with the meter pump, and wherein means is provided efficiently to eliminate air and gas from the liquid in the flow line before said liquid passes through the meter pump, whereby accuracy of volumetric liquid displacement is assured and accurate volume and cost registration thereof at any instant is assured and maintained; to provide a liquid dispensing device having means associated with the flow line in advance of the meter pump, constructed and arranged automatically to stop the meter pump when the reservoir becomes empty, and also to provide associated means to permit the priming of the dispensing device independently of the automatic means; to provide air eliminating means for a liquid dispensing device including a meter pump disposed in the flow line, wherein an auxiliary pump is arranged constantly to withdraw entrained air and vapor gas from the liquid in the flow line as such liquid passes to the meter pump; to provide these and other objects of my invention as will be apparent from a perusal of the following specification when taken in connection with the accompanying drawing, wherein:

Figure 1 is a front elevation, with parts broken away, showing the adaptation of my invention to a gasoline dispensing pump of the computer type; and Figure 2 is a diagrammatic view of the flow line.

Referring now to the drawing in detail, in general the liquid dispensing device comprising the instant application includes a liquid flow line 2, one end of which is connected to a reservoir 4 forming a source of liquid supply. The lowermost portion of the flow line 2 is provided with a strainer 6 and the usual foot valve 8, which is adapted to permit the liquid to pass from the reservoir into the flow line when the meter pump is operating, but which prevents the return of the liquid from the flow line to the reservoir. Disposed in the flow line is a meter pump 10 adapted to be driven by any suitable prime mover, preferably an electric motor 12, as will be hereinafter more fully explained. This meter pump 10 may take a variety of forms, but I prefer to use a gear pump, and particularly do I prefer to use a gear pump of the type disclosed in my prior pending applications relating to dispensing devices.

Connected to the discharge side of the meter pump 10 is a continuation 14 of the flow line, which is provided with a dispensing valve 16, specifically a nozzle valve of ordinary construction, which is arranged to close under spring pressure and also under the force of the liquid passing therethrough and to open under positive actuation by a manually operated lever 18. From one of the shafts 20 of the meter pump a suitable direct sprocket drive 22 is taken through shaft 24 to both the volume and cost register means 26. The cost register means, as is well known in the art, may include any type of speed variator 28 for producing changes in price per unit of volume.

One of the particular features of the present invention resides in providing means continuously to eliminate air and gas from the liquid in the flow line prior to the liquid reaching the meter pump 10. In the present instance I accomplish this by the use of a pump 30, 32 connected to the flow line 34 in the immediate vicinity of the intake side of the meter pump 10. This auxiliary pump is connected at its intake side to the main flow line by means of an adjustable, restricted orifice 36, and thus this pump serves to pull fluid through said restricted orifice. The presence of the restricted orifice causes a differential in pressure between the intake of the auxiliary pump 30, 32 positioned on one side of the orifice 36 and the flow line 34 positioned on the opposite side of the orifice; that is to say, the pressure on the so-called opposite side of the orifice in the flow line is greater than the pressure at the intake port of the auxiliary pump. The differential in pressure between the atmosphere pressure acting upon the fluid in the reservoir 4 and the pressure which is less than atmosphere in the flow line in the vicinity of the intake 34 of the meter pump 10 causes continuous movement of the fluid body within the flow line toward the intake of the meter pump 10 as long as the auxiliary pump 30, 32 continues to function.

The fact that the auxiliary pump 30, 32 is positioned as indicated above and is connected through the aforesaid restricted orifice 36, causes any entrained air or vapor in the flow line coming from the reservoir 4 to the vicinity of the restricted orifice 36, and also in the vicinity of the intake of the meter pump 10, to be withdrawn through the auxiliary pump 30, 32. This auxiliary pump is of larger capacity than the meter pump 10 and therefore causes a continuous volume of air- and gas-free liquid under pressure to be continuously urged into the intake side of the meter pump 10, thereby charging the meter pump with air-free and gas-free liquid under a sufficient pressure. The air passing through the auxiliary pump, accompanied by a small, continuously flowing volume of liquid, is returned preferably to the air chamber of the liquid reservoir 4, the air passing through the usual breather tube to atmosphere, and the liquid settling and being subsequently drawn up through the flow line. The restricted orifice may be made adjustable, as by means of an adjustable needle valve 38, thereby enabling an adjustment of the pressure condition at the intake side of the meter pump which is best suited to the operating characteristics of the meter pump.

Any type of meter pump 10 may be utilized, including gear pumps such as the Svenson pump or the Viking gear pump, which is not made with the same degree of accuracy as the Svenson pump. It is proposed to utilize one of the shafts 20 of the meter pump 10 for driving the volume and cost register, including the usual variator 28. The meter pump 10 and the auxiliary pump 30, 32 are preferably driven from this common shaft 20. Any suitable prime mover, such as an electric motor 40, may be utilized for operating this common shaft 20 and any means shown in any of the prior Svenson applications may be utilized for connecting and disconnecting the prime mover from this common shaft so that the meter pump will be actuated only when dispensing actually occurs. This may include a pressure switch control device, a hydraulic clutch, a magnetic clutch or slip clutch, shown in my prior pending applications.

In the present instance I have disclosed a clutch having a shiftable element 42 adapted to contact a cooperative clutch element 44 on the end of shaft 20. A suitable gear box 46, if desired, may be utilized between clutch 44 and shaft 20 in order to provide an adjustable speed relation when desired. Shiftable element 42 of the clutch is directly operated by a lever 48 in turn actuated by a clutch rod 50 connected to a movable diaphragm 52 of a pressure operated device 54. The diaphragm 52 is adapted to be collapsed or inflated by means of a pressure line 56 connecting with the flow line 14 above a one-way check valve 58, the check valve serving to permit the liquid to flow outwardly through the continuation 14 of the flow line, but restraining its flow in the opposite direction. The outer end of the flow line is provided with the usual sight glass 60 and the usual flexible hose 62 provided with a dispensing valve 16, herein specifically shown as a nozzle valve manually opened by the lever 18 and closed by spring pressure. The pressure operated device 54 in its upper portion is provided with a spring normally adapted to depress the diaphragm 52 to such a position as to shift the clutch member 42 to closed position, whereas when there is a predetermined pressure in the flow line 14, this pressure, through line 56, will raise the flexible diaphragm to break the clutch connection between motor 40 and clutch 44 on the meter pump. Motor 40 is provided with a conditioning switch 68 adapted to be operated by the rod 61 on the end of a lever 63, the outer end 64 of which forms a nozzle support. The spring 66, when the nozzle is removed, depresses rod 61 to start the motor. When the nozzle is placed upon the support 64, the weight thereof, acting against the spring 66, opens the motor switch to stop the motor.

The action of the mechanism is such that when the nozzle is removed from the hook and the motor started, the motor will operate freely without actuating the meter pump, due to the fact that a column of incompressible liquid under pressure is confined between the check valve 58 and the spring closed nozzle valve 16. This pressure, acting through the inflatable diaphragm 52, moves the same up to actuate the clutch rod to break the clutch connection so that the prime mover will not operate the meter pump nor the registering meter. However, as soon as the nozzle valve is opened, the pressure in the flow line drops to a sufficient point to relieve the pressure in the line 56 beneath the diaphragm so that the spring within the pressure device 54 pushes the diaphragm down to actuate rod 50 downward to cause the clutch connection to be made, whereby the running motor will actuate the meter pump for drawing liquid constantly through the flow line 2 from the reservoir, in the dispensing operation. The meter pump running, the sprocket connection 22 actuates the price and volume register continuously and synchronously with the meter pump during the dispensing operation.

Since the gear of the pump 30, 32 is driven from the shaft 20, the gear pump 30, 32 is driven simultaneously with the meter pump 10, and since this is a pump of larger capacity than the meter pump 10, any air or gas entrained in the liquid 2 will be drawn through the restricted orifice 36 by the force of the pump 30, 32, and will be discharged back into the reservoir 4. In addition, a continuous stream of liquid will likewise be drawn through the restricted orifice 36, through pump 30, 32 and back into tank 4. Thus, through the pull of the pump 30, 32, the air and gas is removed from the liquid flowing into the flow line 2 on its way to the meter pump 10, and hence the meter pump 10 is continuously supplied with an abundance of liquid from which air and gas is continuously removed. Since the meter pump 10 has no by-pass and since the flow line 2 to the meter pump 10 and the continuation flow line 14 are maintained full of de-aired and de-gasified liquid, and since this line is maintained under pressure even after dispensing, no air can enter the system. Immediately upon the termination of the dispensing operation, the nozzle valve 16, the check valve 58 and the foot valve 6 all serve to hold the flow line under pressure to keep air out and likewise to maintain in the flow line pressure to operate the pressure device 54. In addition this incompressible column of stationary liquid locks the members of the meter pump from operation and thereby holds the registering mechanism immovable. If desired, the bottom end of the discharge line 34 from the pump 30, 32 may be provided with a one-way check valve 70 which will permit the liquid and air to be discharged through this valve, but which will prevent the passage of air and liquid upwardly through the pipe 34. In some instances I prefer not to use such a valve.

Means is provided for automatically stopping the motor in the event that the reservoir 4 becomes empty or in the event that a break occurs in the flow line leading from the reservoir 4 to the suction side of the pump. This means comprises an ordinary type of float switch 72 disposed directly in the flow line 2 in advance of the suction side of the pump, and including a float (not shown) disposed in the float switch box, and suitable electrical contact devices operable so that when the flow line 2 is full of liquid the float will rise, making contact at the switch of the float switch, which in turn is connected to the motor through a switch 84 in the switch mechanism 82. Conversely, when the flow line 2 is empty, or contains mostly air, the float will drop, breaking the switch of the float switch and hence shutting off the motor. When the float switch has electrically disconnected the motor, I have so arranged the switch mechanism 82 that when a push button 88 is urged inwardly against the action of a coil spring 90, the motor is electrically connected with the source of power. Urging the push button inwardly short circuits the cut-out controlled by the float switch and in this manner enables the starting of the motor despite the open position of the float switch.

Manifestly, in lieu of the switch 72, I may provide a simple type of float in the tank or reservoir 4, with a simple switch connection to the auxiliary switch 82 of the motor for cutting out the motor when the tank becomes empty.

This arrangement has the advantage which is inherent in all my other pending applications, namely, the reduction of the load on the dispensing meter pump or pump to a minimum. In other words, the meter pump which receives its power to propel the fluid from the electric motor is subjected only to the pressure required to force fluid through the nozzle when dispensing, and to build the fluid up to a certain pressure when the nozzle valve is closed. This is to be clearly distinguished from other conventional devices now on the market wherein the pump and the meter are subjected to the load which is required to drive the registering mechanism. This load which is placed upon the meter and pump in conventional devices serves to encourage slippage, a factor which not only introduces error but requires other auxiliary means, such as by-pass and the like, to compensate for these conditions.

This invention is not limited to the use of a gear pump for the meter pump, but contemplates other forms of pumps. The fact that the air is eliminated prior to the delivery of fluid to the intake of the meter pump, and that this liquid is actually delivered to the meter pump under the required pressure, enables the use of meter pumps which are not extremely accurate in structural design; that is to say, the absence of air and the presence of a supply of charging fluid under pressure reduces the movement of the pump to a minimum in drawing in the fluid, hence eliminating any tendency to take in air. This fact, coupled with the reduction in load on the pump, as aforesaid, enables the use of various types of pumps which under other conditions might not be practical for dispensing purposes in an arrangement contemplated herein.

Having thus described my invention, what I claim as new and desire to secure by Letters Patent is:

1. In a liquid dispensing device, the combination of a reservoir forming a source of liquid supply, a flow line connected to the reservoir, a meter pump in said flow line, a prime mover for driving said meter pump, registering mechanism operated synchronously with the meter pump, a second pump connected to the flow line at the inlet end of the meter pump, said second pump being connected to said prime mover and driven thereby whenever the meter pump is driven, and a restricted orifice in the connection between the flow line and said second pump for continuously eliminating entrained air from the liquid flowing to the meter pump, said second pump having its discharge connected to the reservoir.

2. In a liquid dispensing device, the combination of a reservoir forming a source of liquid supply, a flow line connected thereto, a meter pump in said flow line, a prime mover for driving said meter pump, a pipe connected to the flow line in advance of the meter pump, said pipe having a restricted orifice, and means operative at all times during the operation of the meter pump for drawing liquid and air from the flow line through said restricted orifice and for discharging said liquid back to the reservoir and said air to atmosphere.

3. In a liquid dispensing device, the combination of a reservoir forming a source of liquid supply, a flow line connected thereto and having a dispensing valve therein, a meter pump in said flow line, a prime mover for driving the meter pump, a pump driven at all times synchronously with said meter pump, a pipe connecting the flow line at the inlet side of the meter pump with said second pump, the outlet of said second pump discharging back to the reservoir, and a restricted orifice in said pipe.

4. In a liquid dispensing device, the combination of a reservoir forming a source of liquid supply, a flow line connected thereto and having a dispensing valve therein, a meter pump in said flow line, a prime mover for driving the meter pump, registering means driven by the prime mover in synchronism with the meter pump, and switch means connected with the flow line between the meter pump and the reservoir, said switch means including an electrical connection to the prime mover and means responsive to the fluid in the flow line between the meter pump and the reservoir and operative when said flow line becomes full of air for stopping the prime mover.

5. In a liquid dispensing device, the combination of a reservoir forming a source of liquid supply, a flow line connected thereto and having a dispensing valve therein, a meter pump in said flow line, an electric motor for driving the meter pump, registering means driven by the motor in synchronism with the meter pump, a conditioning switch for the electric motor, a clutch between the electric motor and the meter pump, automatic means responsive to the opening of the dispensing valve for actuating the clutch to connect the meter pump to the motor, means automatically operative when the flow line between the meter pump and the reservoir becomes full of air for stopping the electric motor, and manually operated means for operating the motor upon actuation of the conditioning switch to cause the motor to drive the meter pump to prime the dispensing device.

6. In a liquid dispensing device, the combination of a reservoir forming a source of liquid supply, a flow line connected thereto and having a dispensing valve therein, a meter pump in said flow line including a driven shaft, a second pump driven by said driven shaft and operating whenever the meter pump operates, and a prime mover for operating said driven shaft, said pump having a greater volumetric displacement than the meter pump, said pump being connected to the flow line adjacent the inlet side of the meter pump, said connection including a restricted orifice, and a connection from the discharge side of said pump to the reservoir.

7. In a liquid dispensing device, the combination of a reservoir forming a source of liquid supply, a flow line connected to the reservoir, a meter pump in said flow line, a dispensing valve in said flow line beyond said meter pump for controlling the flow of liquid from said line, power means for driving said meter pump, clutch means interposed between said power means and said meter pump, a second pump operatively connected to said power means and driven thereby whenever said meter pump is driven, a conduit having a restricted passage and connecting the suction side of said meter pump to the intake of said second pump, means connected to the outlet of said second pump for discharging therefrom air eliminated from the liquid supplied to the suction side of said meter pump and means responsive to the pressure of the liquid in the flow line between said dispensing valve and said meter pump for controlling said clutch means to connect and disconnect said meter pump to and from said power means as said dispensing valve is opened and closed.

ERNEST J. SVENSON.